United States Patent
Tian et al.

(10) Patent No.: US 12,213,411 B2
(45) Date of Patent: Feb. 4, 2025

(54) METHOD FOR PRODUCING RAW COTTON OF MACHINE-HARVESTED LONG-STAPLE COTTON WITH MODAL LENGTH OF GREATER THAN OR EQUAL TO 35MM

(71) Applicants: Institute of Cash Crops, Xinjiang Academy of Agricultural Sciences, Xinjiang (CN); Awati Xinya Cotton Industry Co., Ltd., Xinjiang (CN)

(72) Inventors: Liwen Tian, Xinjiang (CN); Jie Kong, Xinjiang (CN); Honghai Luo, Xinjiang (CN); Liang Wang, Xinjiang (CN); Zhiwu Xu, Xinjiang (CN); Bin Zhu, Xinjiang (CN); Guoling Ni, Xinjiang (CN); Tongren Wang, Xinjiang (CN)

(73) Assignees: INSTITUTE OF CASH CROPS, XIN JIANG ACADEMY OF AGRICULTURAL SCIENCES, Xinjiang (CN); AWATI XINYA COTTON INDUSTRY CO., LTD., Xinjiang (CN)

( * ) Notice: Subject to any disclaimer, the term of this patent is extended or adjusted under 35 U.S.C. 154(b) by 97 days.

(21) Appl. No.: 18/139,911

(22) Filed: Apr. 26, 2023

(65) Prior Publication Data

US 2024/0074354 A1 Mar. 7, 2024

(30) Foreign Application Priority Data

Apr. 27, 2022 (CN) .......................... 202210463072.4

(51) Int. Cl.
*D01B 1/02* (2006.01)
*A01D 45/06* (2006.01)
(Continued)

(52) U.S. Cl.
CPC .......... *A01D 91/02* (2013.01); *A01D 45/065* (2013.01); *A01M 7/00* (2013.01); *D01B 1/06* (2013.01); *D01G 9/08* (2013.01)

(58) Field of Classification Search
CPC ............... D01B 1/02; D01B 1/06; D01G 9/08
(Continued)

(56) References Cited

U.S. PATENT DOCUMENTS

| 60,754 A | * | 1/1867 | Lewanowski | ............ D01G 9/00 |
| 1,721,932 A | * | 7/1929 | Streun | ...................... D01B 1/04 19/37 |

(Continued)

FOREIGN PATENT DOCUMENTS

| CN | 107241985 A | 10/2017 |
| CN | 111560652 A | 8/2020 |

(Continued)

OTHER PUBLICATIONS

Chinese Patent Search Report for CN2022104630724 issued Nov. 17, 2022.

*Primary Examiner* — Tajash D Patel
(74) *Attorney, Agent, or Firm* — Yue (Robert) Xu; Apex Attorneys at Law, LLP

(57) ABSTRACT

The present disclosure discloses a method for producing raw cotton of machine-harvested long-staple cotton with a modal length of greater than or equal to 35 mm, including the steps: planting sea-island long-staple cotton and machining seed cotton, wherein planting the sea-island long-staple cotton includes preparation before machine harvesting, defoliation and ripening, choosing a cotton variety, etc.; and machining the seed cotton includes preparation before seed cotton ginning, mechanical separation of cotton seeds and raw cotton, and finishing the separated raw cotton. Raw cotton fibers obtained by the method of the present disclosure have main quality indexes that: a fiber length is 36.5-38.4 mm, a (Continued)

specific strength is 42.3-46.1 cN/tex, a uniformity is 86.2-87.0%, a foreign-fiber content is 0.2-0.4 g/t, and an impurity content is 2.6-3.4%. According to the method, not only can impurities and foreign fibers be effectively removed, but also mechanical damage to the raw cotton of the machine-harvested long-staple cotton with the modal length of greater than or equal to 35 mm is relatively small.

6 Claims, 5 Drawing Sheets

(51) Int. Cl.
   *A01D 91/02* (2006.01)
   *A01M 7/00* (2006.01)
   *D01B 1/06* (2006.01)
   *D01G 9/08* (2006.01)

(58) Field of Classification Search
   USPC .................................. 19/48 R, 200, 66 CC
   See application file for complete search history.

(56) References Cited

U.S. PATENT DOCUMENTS

| | | | |
|---|---|---|---|
| 3,987,615 A * | 10/1976 | Hill, Jr. .................. | D01B 1/00 19/65 R |
| 4,103,397 A * | 8/1978 | Jackson .................. | D01B 1/04 19/66 CC |
| 4,140,503 A * | 2/1979 | Vandergriff ........ | B01D 46/0056 55/290 |
| 4,344,272 A | 8/1982 | Gaudette et al. | |
| 4,974,293 A * | 12/1990 | Baker ...................... | D01B 1/02 19/40 |
| 5,155,886 A * | 10/1992 | Schrader .................. | D01B 1/08 19/205 |
| 7,653,971 B2 * | 2/2010 | Cory ...................... | D01G 23/00 19/66 CC |
| 2011/0284432 A1 * | 11/2011 | Van den Hurk ......... | D01G 9/00 209/509 |
| 2014/0090207 A1 * | 4/2014 | Van Doorn .............. | D01B 1/08 19/55 R |
| 2014/0304950 A1 * | 10/2014 | Lakshminarayan ... | D01G 15/80 19/100 |
| 2018/0187335 A1 * | 7/2018 | Thomas .................... | D01B 1/02 |
| 2021/0148008 A1 * | 5/2021 | Cory ...................... | G01K 13/08 |
| 2022/0042211 A1 * | 2/2022 | Zhou ........................ | D01G 9/14 |

FOREIGN PATENT DOCUMENTS

| | | |
|---|---|---|
| CN | 111713365 A | 9/2020 |
| CN | 111764013 A | 10/2020 |
| CN | 113403691 A | 9/2021 |
| CN | 215251338 U | 12/2021 |

* cited by examiner

METHOD FOR PRODUCING RAW COTTON OF MACHINE-HARVESTED LONG-STAPLE COTTON WITH MODAL LENGTH OF GREATER THAN OR EQUAL TO 35MM

CLAIM OF PRIORITY

This application claims priority under the Paris Convention to Chinese patent application No. 202210463072.4, filed on Apr. 27, 2022, the entirety of which is hereby incorporated by reference for all purposes as if fully set forth herein.

The present disclosure relates to the technical field of cotton planting and machining, in particular to a method for producing raw cotton of machine-harvested long-staple cotton with a modal length of greater than or equal to 35 mm.

BACKGROUND

On the basis that Xinjiang is the unique long-staple cotton planting region in China, China has become one of the three major long-staple cotton production countries (China, the United States, and the Egypt) in the world so as to ensure long-staple cotton raw material supply indispensable for high-end cotton textiles in China. However, the domestic labor cost is rapidly increased in recent years, so whole-process mechanization of Xinjiang sea-island long-staple cotton cannot be implemented due to no planting management technology suitable for machine harvesting and no technology of machining seed cotton of machine-harvested long-staple cotton after harvesting in a cotton field, resulting in that the production cost of the long-staple cotton reaches up to 40,500 yuan/hm$^2$ or more, and the long-staple cotton planting return of cotton growers is obviously inferior to that of common upland cotton, which causes a sharply decreasing trend of a planting scale of Xinjiang long-staple cotton in recent years from an annual planting area of 140 thousand hm$^2$ in the peak period to the current annual planting area of about 30 thousand hm$^2$.

The quality of Xinjiang sea-island long-staple cotton is relatively close to that of American Pima cotton, but there are still large differences in many aspects, specifically as follows:

1. the natural ecological conditions (including heat, water, and soil resources) of the major production region of Xinjiang sea-island long-staple cotton are obviously inferior to those of the American production region, and there are adverse factors of low soil fertility of the cotton field, high salt and alkali contents, severe water shortage, etc. In order to overcome the weakness of poor natural conditions of the cotton region in Xinjiang and sufficiently tap the existing resource potential, after many years of research, scientific and technical personnel in Xinjiang proposes a sea-island long-staple cotton planting mode matched with the nature environment of Xinjiang, i.e., a planting mode of "short, dense, early, and membrane" and drip watering. In such unique planting management technical mode, the cotton field in Xinjiang has an average row spacing of only 38 cm and a plant spacing of about 11.5 cm, the row and plant spacings thereof are superior to those of a cotton field of the American Pima cotton, particularly, the row spacing is much lower than that of 101 cm of the cotton field of the American Pima cotton, and a planting density of the cotton field in Xinjiang is about twice of that of the American Pima cotton.

2. Due to the insufficient heat resource in Xinjiang, the long-staple cotton planted in this region commonly needs to be artificially ripened (while the American Pima cotton can be completely and naturally matured), and additionally, the Xinjiang long-staple cotton has the characteristics of large leaves, a large amount of fluff and an excessively compact plant type, resulting in that the Xinjiang long-staple cotton is insensitive to a defoliating agent and a ripening agent, which causes poor effects of the conventional defoliating and ripening technologies and seriously affects production of the Xinjiang machine-harvested long-staple cotton.

3. Due to the planting management characteristics of the Xinjiang long-staple cotton, on one hand, many sundries are mixed in the Xinjiang machine-harvested sea-island long-staple cotton with a fiber length of greater than or equal to 35 mm, and seed cotton thereof has an impurity content of up to 20% or more which is much higher than that of machine-harvested seed cotton of the American Pima cotton (the impurity content of the American Pima cotton is about 10%), accompanied by pollution of foreign fibers such as mulching membranes, drip watering tapes, and hair; and on the other hand, in the machining process of the Xinjiang sea-island long-staple cotton, impurities, in particular to foreign fibers, are difficult to clean up, it is liable to generate serious fiber mechanical damage and a stringy cotton phenomenon in the machining process, and additionally, for the Xinjiang long-staple cotton, the planting scale is small, the amount of retail grower households is large, and management is not standardized, resulting in that to-be-machined seed cotton purchased by ginning enterprises has large differences in grade, water content, and impurity content, which brings difficulties to the debugging work in the seed cotton machining process.

By further analysis, it is found that long-staple cotton has the following problems to be solved urgently in the production: 1, in recent more than ten years, cotton planting densities of the main cotton production countries worldwide have an obviously increasing trend, due to the own characteristics of extra-long-staple cotton, under the same planting management conditions, machine-harvested seed cotton contains many impurities, resulting in that the impurity cleaning strength and processes are increased during machining and it is liable to generate serious fiber mechanical damage and the phenomenon of much stringy cotton, and additionally, an existing production technology link cannot completely solve the problem of foreign fiber pollution of the cotton, resulting in that the production and machining quality of the extra-long-staple cotton is reduced, and thus, there is an urgent need for researching and developing a machining method applicable to the extra-long-staple cotton; and 2, most of the main cotton production countries worldwide cannot implement all-season planting, and particularly the winter and the early spring are both unsuitable for cotton to grow due to a low temperature or drought with little rainfall, and thus, it is necessary to research and develop cotton growth and development artificial intervention technologies including the artificial ripening technology for solving the problem of inconsistent maturity degrees of the cotton so as to ensure that before the winter comes, concentrated boll opening of the cotton is implemented to facilitate mechanical harvesting. Although an American machined-harvested Pima cotton machining technology (which mainly adopts machine-harvested Pima cotton machining equipment of American Continental Eagle Corp. and a process thereof) has been relatively matured, due to the above differences between the Xinjiang sea-island long-staple cotton and the Pima cotton, when the American machined-harvested Pima cotton machining technology is applied to cotton machining of the Xinjiang sea-island long-staple cotton, the impurity removing effect is not ideal, and in addition to no foreign fiber cleaning function, finally produced Xinjiang sea-island raw cotton generally has an impurity content of up to 6% or more, and a foreign-fiber content of up to about 1.5 g/t. More seriously, due to the obvious fiber mechanical damage of the technology, two key quality indexes, i.e., a fiber length and a strength, of machined raw cotton are respectively reduced by 2-3 mm and 5-7 cN/tex, the raw cotton of the finally produced Xinjiang machine-harvested sea-island long-staple cotton has a length of about 34 mm, and a fiber strength of about 37.0 cN/tex and even has a lower fiber strength, and quantities of defects and stringy cotton are 15 times or more of those of artificially picked long-staple cotton. The First Division of the Xinjiang Production and Construction Corps once introduced complete sets of equipment from the United States, and the machining result of the equipment verifies the conclusion above.

In a word, the applicant cannot effectively remove impurities and foreign fibers in the Xinjiang sea-island long-staple cotton with the fiber length of greater than or equal to 35 mm on the basis of existing machine-harvesting machining technologies at home and abroad, and the fiber mechanical damage is large, resulting in that the spinnability of the Xinjiang sea-island long-staple cotton is seriously influenced, and thus, it is clear and definite that when the Xinjiang machine-harvested long-staple cotton with the fiber length of greater than or equal to 35 mm is machined, the existing planting management and machine-harvested seed cotton machining technology at home and abroad cannot be used indiscriminately.

In order to obtain a reliable machining technology for the sea-island long-staple cotton with the fiber length of greater than or equal to 35 mm, the team of the present disclosure researches and develops a machine-harvested sea-island long-staple cotton production technology, and particularly when seed cotton is machined, on the premise of ensuring small mechanical damage, specially researches and develops a machining technology for the sea-island long-staple cotton with the fiber length of greater than or equal to 35 mm and an impurity and foreign fiber removal technology thereof. In addition, the team of the present disclosure further systematically researches key methods in the sea-island long-staple cotton planting links, such as machine-harvested variety selection, plant and row spacing matching, preparation before picking, defoliation and ripening, etc, so as to create a production technology more suitable for raw cotton of high-quality machine-harvested long-staple cotton. By the present disclosure, we successfully implement rapid recovery of production of the Xinjiang sea-island long-staple cotton with the fiber length of greater than or equal to 35 mm, and meanwhile, provide technical references for production of long-staple cotton in other cotton planting countries so as to fulfill the aim of stably supplying a high-end textile raw material, i.e., the sea-island raw cotton with the fiber length of greater than or equal to 35 mm.

SUMMARY

A main objective of the present disclosure is to provide a method for producing raw cotton of machine-harvested long-staple cotton with a modal length of greater than or equal to 35 mm. The present disclosure aims to solve the technical problems above.

In order to achieve the objective above, the present disclosure provides a method for producing raw cotton of machine-harvested long-staple cotton with a modal length of greater than or equal to 35 mm, including the steps:

S0, planting cotton, including:
S01, preparation before machine harvesting: allowing the irrigation amount of last watering a cotton field to be smaller than or equal to 375 $m^3/hm^2$, and cleaning up or recovering cotton field sundries; and
S02, defoliation and ripening: when a natural boll opening rate of the cotton field reaches 30-45%, spraying a defoliating agent and a ripening agent;
S1, selecting machine-harvested seed cotton: selecting machine-harvested seed cotton having an impurity content of smaller than or equal to 15.8%, a foreign-fiber content of smaller than or equal to 1.3 g/t, and a moisture regain rate of smaller than or equal to 15%;
S2, cleaning seed cotton, including:
S21, carrying out heavy-impurity cleaning by using a heavy-impurity cleaning machine;
S22, carrying out foreign fiber cleaning by adopting a composite foreign fiber cleaning machine that combines winding and wind cleaning; and
S23, carrying out 3-6 passes of cleaning on the seed cotton by alternately using an inclined seed cotton cleaning machine and a large-impurity seed cotton cleaning machine;
S3, ginning: ginning the cleaned seed cotton obtained from the step S2 by adopting a stamping-knife-type or hobbing-cutter-type roller gin so as to separate cotton seeds from raw cotton; and
S4, finishing raw cotton, including:
S41, by using a cotton dust collection cage, carrying out staple collection on the raw cotton obtained by ginning in the step S3 so as to obtain separated raw cotton;
S42, carrying out at least one pass of cleaning and impurity removal on the separated raw cotton by an airflow cleaning machine, and carrying out 1-2 passes of cleaning by a ginned cotton carding machine; and
S43, carrying out staple collection by using a cotton dust collection cage again, and carrying out packaging so as to obtain machine-harvested long-staple cotton with low mechanical damage to fibers.

Preferably, the step S0 further includes: choosing a cotton variety: choosing sea-island long-staple cotton with middle-sized or/and small leaves, the front and back surfaces of the leaves having an intermediate or small amount of fluff or having no fluff, a plant type being a mixed type or a properly loosened type, the lowest ground clearance of blooming bolls being greater than or equal to 18 cm, a final main stem having a diameter of 9.8-11.8 mm, plants in a boll period being not prone to lodging, a fiber length of greater than or equal to 37 mm, and a specific strength of greater than or equal to 42.5 cN/tex.

Preferably, the step S0 further includes: plant and row spacing configuration: during sowing, adopting a wide-narrow row planting mode or an equal row spacing planting mode, specifically: when the wide-narrow row planting mode is selected, on the premise that a wide row+a narrow row=76 cm, a row spacing between wide rows is 64-66 cm, a row spacing between corresponding narrow rows is 12-10 cm, or a row spacing between wide rows is 72 cm, a row spacing between corresponding narrow rows is 4 cm, and a plant spacing is 10.5-11.8 cm; and when the equal row spacing planting mode is selected, a row spacing is 76 cm, and a plant spacing is 6.5-8.5 cm.

Preferably, in the step S01, the time of stopping watering may be set in the middle ten days and the last ten days of August or the first ten days of September, and for example, for a sandy land, the time of stopping watering can be set in the first ten days of September.

The irrigation amount of last watering the cotton field is smaller than or equal to 375 m³/hm², and cotton field sundries are cleaned up or recovered.

Preferably, in the step S02, when a natural boll opening rate of the cotton field reaches 30-45%, and a duration of cotton bolls at the upper portion reaches 35-50 d, the defoliating agent and the ripening agent are sprayed. Preferably, weather selection conditions in the step S02 are that: no rain falls in 24 h after the defoliating agent and the ripening agent are sprayed, the lowest air temperature in 3 to 5 days is 10-15° C., and the daily mean temperature in 7 to 10 days is 18-21° C.;

the defoliating agent is thidiazuron or a thidiazuron complex preparation, and the ripening agent is ethephon;

in the step S02, the defoliating agent and the ripening agent are sprayed to the cotton field twice; and a spraying solution of the defoliating agent and the ripening agent in the step S02 is selected from one of the following solutions:

a first solution: for the first time, spraying 450 mL/hm² of 50% thidiazuron, 900 mL/hm² of 40% aqueous ethephon, and an assistant; and for the second time, after 7-10 d, spraying 300 mL/hm² of 50% thidiazuron, 600 mL/hm² of 40% aqueous ethephon, and an assistant; and a second solution: for the first time, spraying 120 mL/hm² of a suspending agent thidiazuron & diuron, 480 mL/hm² of an assistant alkyl ethyl sulfonate, and 450 mL/hm² of 40% aqueous ethephon; and for the second time, after 7-10 d, spraying 150 mL/hm² of a suspending agent thidiazuron & diuron, 600 mL/hm² of alkyl ethyl sulfonate, and 1,050 mL/hm² of 40% aqueous ethephon, wherein the total active ingredient content of the suspending agent thidiazuron & diuron is 540 g/L, wherein the diuron content is 180 g/L, and the thidiazuron content is 360 g/L; and the active ingredient content of the assistant alkyl ethyl sulfonate is 280 g/L, and a dosage form of the assistant alkyl ethyl sulfonate is a soluble concentrate.

Preferably, the step S23 specifically includes:

carrying out one pass of cleaning by the inclined seed cotton cleaning machine;

carrying out one pass of cleaning by the large-impurity seed cotton cleaning machine;

carrying out one pass of cleaning by the inclined seed cotton cleaning machine;

carrying out 0 to 1 pass of cleaning by the large-impurity seed cotton cleaning machine; and carrying out 0 to 2 passes of cleaning by two inclined seed cotton cleaning machines arranged in an up-and-down staggered stacking manner.

Preferably, the composite foreign fiber cleaning machine adopts a structure having two alternately running channels of winding rods; winding rods in each channel have a diameter of 85-95 mm and a length of 2.5-3.0 m, toothed nails with a length of 30-35 mm are designed on the surface of each winding rod, a mounting density of the toothed nails is that four toothed nails are mounted around one cycle of each winding rod, the toothed nails have an axial spacing of 90-110 mm, and the toothed nails are arranged in a staggered manner along a peripheral direction; the winding rods in each channel have a left-right spacing of 154-164 cm and an up-down spacing of 176-187 cm; and 3 to 5 plucker rollers with a diameter of 400-420 mm, preferably 400 mm are designed below the winding rods, and spacing bar gratings with a spacing of 9.5-10.5 mm are arranged under the plucker rollers.

Preferably, the method further includes a step S24 between the step S22 and the step S23, namely, when the water content of the to-be-machined seed cotton is 10-17% or the relative humidity of air in a ginning site is 86-96%, drying to-be-machined seed cotton by adopting a drying device which is a drying tower with 13 to 21 layers; and after the step S24, when the water content after the to-be-machined seed cotton is dried is still greater than or equal to 12%, drying is carried out again after the seed cotton is cleaned by using the large-impurity seed cotton cleaning machine for the first time in the step S23.

Preferably, before the step S21, the step S2 further includes a step S20 of stacking: stacking to-be-machined seed cotton selected in the step S1 for 7-11 d.

Preferably, the inclined seed cotton cleaning machine includes 6 toothed nail rollers slantingly arranged in a shell from top to bottom, each toothed nail roller has a diameter of 420-430 mm, a working linear speed of 8.96-9.32 m/s, and a rotating speed of 400 r/min, toothed nails mounted on each toothed nail roller have a length of 49-51 mm, each toothed nail is in a form of a slender cone without a cone tip, a semi-ellipsoid at the tip end of each toothed nail has a diameter of 9-10 mm, and a tangent plane at the rear end of each toothed nail has a maximum diameter of 13-14 mm; the inclined seed cotton cleaning machine further includes spacing bar gratings with a spacing of 9.5-10.5 mm.

Preferably, the large-impurity seed cotton cleaning machine comprises one large roller which is arranged in a shell and is provided with a rack, a cotton brushing device matched with the large roller, and one independent recovery device, wherein the large roller has a diameter of 860-900 mm; during operation, the large roller has a linear speed of 8.61-8.89 m/s and a rotating speed of 155-165 r/min (preferably, 160 r/min), the cotton brushing device is made of carbon-steel spring wires with a diameter of 0.35-0.5 mm, and the cotton brushing device is equipped with 88-92 bundles (preferably, 90 bundles) of steel wires per meter in length, each bundle includes 60 to 70 steel wires, and a spacing between the bundles is 10.5-11.5 mm, preferably 11 mm; and U-shaped racks at an angle of 55-57° are mounted on the surface of the large roller, four racks are mounted per cycle, and the racks have a circumferential spacing of 29.5-30.5 mm, preferably 30 mm.

Preferably, the ginned cotton carding machine includes six toothed nail rollers slantingly arranged in a shell from top to bottom, and four cotton baffles each arranged above a gap between two adjacent toothed nail rollers so as to prevent the toothed nail rollers from circularly and disorderly cleaning raw cotton; the toothed nail rollers have a diameter of 320-350 mm, a working linear speed of 8.96-9.32 m/s, and a rotating speed of 450 r/min; toothed nails mounted on each toothed nail roller have a length of 49-51 mm; each toothed nail is in a form of a slender cone without a cone tip; a semi-ellipsoid at the tip end of each toothed nail has a diameter of 7-8 mm; a tangent plane at the rear end of each toothed nail has a maximum diameter of 9-10 mm; and the ginned cotton carding machine further includes spacing bar gratings with a spacing of 7.5-11.5 mm.

Preferably, the roller gin is a stamping-knife-type roller gin or a hobbing-cutter-type roller gin; and during operation, parameters of a coinciding spacing and a dead point spacing of the stamping-knife-type roller gin are adjusted according to a size of gross cottonseeds, wherein the dead point spacing is 42-50% of a waist diameter of the gross cottonseeds, and the coinciding spacing is 47-55% of the dead point spacing.

These technical solutions proposed by the present disclosure relate to cotton variety selection, plant and row spacing matching, defoliation and ripening, preparation before machine harvesting, and creative designs of key equipment and technologies thereof involved in production links such as machining equipment and processes thereof, including equipment improvement, parameter determination, research and development of the processes and related technologies, etc., and establish a production method more suitable for the row cotton of the machine-harvested long-staple cotton with the modal length of greater than or equal to 35 mm.

By using the seed cotton machining method according to the present disclosure, fiber mechanical damage caused in the machining process can be reduced so as to ensure the fiber length and the strength after machining.

According to the raw cotton of the machine-harvested long-staple cotton obtained by using the production method of the present disclosure, the main quality indexes of fibers are as follows: a fiber length is 36.5-38.4 mm, a specific strength is 42.3-46.1 cN/tex, a uniformity is 86.2-87.0%, a foreign-fiber content is 0.2-0.4 g/t, and an impurity content is 2.6-3.4%; there is no obvious quality difference in the indexes of the fiber length, the specific strength, and the uniformity between the row cotton of the machine-harvested long-staple cotton and normal hand-picked sea-island raw cotton; and the foreign fiber pollution of the row cotton of the machine-harvested long-staple cotton is obviously lower than that of the hand-picked cotton, but the impurity content of the row cotton of the machine-harvested long-staple cotton is slightly higher than that of the hand-picked cotton. After cotton-spinning enterprises use the row cotton of the machine-harvested long-staple cotton, a conclusion that the sea-island raw cotton produced by the method can satisfy the requirements for spinning high-end cotton textiles is verified.

Therefore, the method is helpful for promoting popularization and application of the sea-island cotton machine harvesting technology and ensuring sustainable development of the sea-island cotton.

By further investigation and analysis, it is indicated that: photo-thermal resources of the cotton planting countries Greece and Turkey have obvious similarity with those of Xinjiang of China, the cotton growth period and planting management in Greece and Turkey are also highly consistent with those in Xinjiang, and the cotton growth key season generally is from April to September every year. In order to avoid the phenomenon that cotton grows in an unsuitable growing environment, particularly in a low-temperature sparse-sunlight environment in winter, resulting in that growth and development are delayed, the cotton cannot normally open bolls and be matured and even is directly died due to the natural low temperature, and in order to ensure that the cotton grows and develops well in the limited growing season to obtain high-yield and high-quality cotton and implement mechanical harvesting, scientific management measures must be taken, such as a measure of preventing a case that cotton is sown too early or is matured too late. For this, in addition to selecting an early-maturing variety with a short growth period to the greatest extent, a grower also should perform necessary artificial intervention on a cotton field which still cannot be completely and normally matured before the low temperature.

The applicant indicates by research that: chemical defoliation and ripening is the most effective artificial intervention method for accelerating maturity of the cotton, and thus, it is very necessary to research and develop a scientific defoliation and ripening method.

The applicant finds by research that: when the cotton is watered in the late growth period, it is liable to cause a phenomenon that due to the weights of a great amount of to-be-opened cotton bolls at the upper portions of fruit spurs, stems have insufficient bending resistance or load-carrying capacity to be prone to lodging; and the applicant proposes that for watering in the late growth period, particularly for last watering, the irrigation amount should be smaller than or equal to 375 $m^3/hm^2$.

The applicant preferably uses a lodging-resistant cotton variety of which a plant type is a mixed type or a properly loosened type and of which a main stem has a diameter of 9.8-11.8 mm for planting; the lodging-resistant cotton variety has middle-sized or/and small leaves; the front and back surfaces of the leaves have an intermediate or small amount of fluff or have no fluff; and the lowest ground clearance of blooming bolls is greater than or equal to 18 cm.

The applicant combines a cotton field cleaning technology before machine harvesting, so that the impurity content of the machine-harvested seed cotton is greatly reduced, and a collect rate is improved, thereby reducing mechanical loss of fibers caused by the seed cotton machining process.

In addition, in order to achieve the objective of providing the method for producing the raw cotton of the machine-harvested long-staple cotton with the modal length of greater than or equal to 35 mm according to the present disclosure, in consideration of the fiber mechanical damage and the planting management measures as well as influence of the environment on the fiber quality of a selected variety, a preferred cotton variety is that: the key indexes of the fiber quality of the variety meet that: a fiber length is greater than or equal to 37 mm, and a specific strength is greater than or equal to 42 cN/tex.

BRIEF DESCRIPTION OF THE DRAWINGS

In order to more clearly illustrate the technical solution of the embodiments of the present disclosure or the prior art, the drawings used in the embodiments or description in the prior art will be briefly described below. Obviously, the drawings described below only relate to some embodiments of the present disclosure, and those of ordinary skill in the art also can obtain other drawings, without any inventive work, according to structures shown in these drawings.

Figure 1:
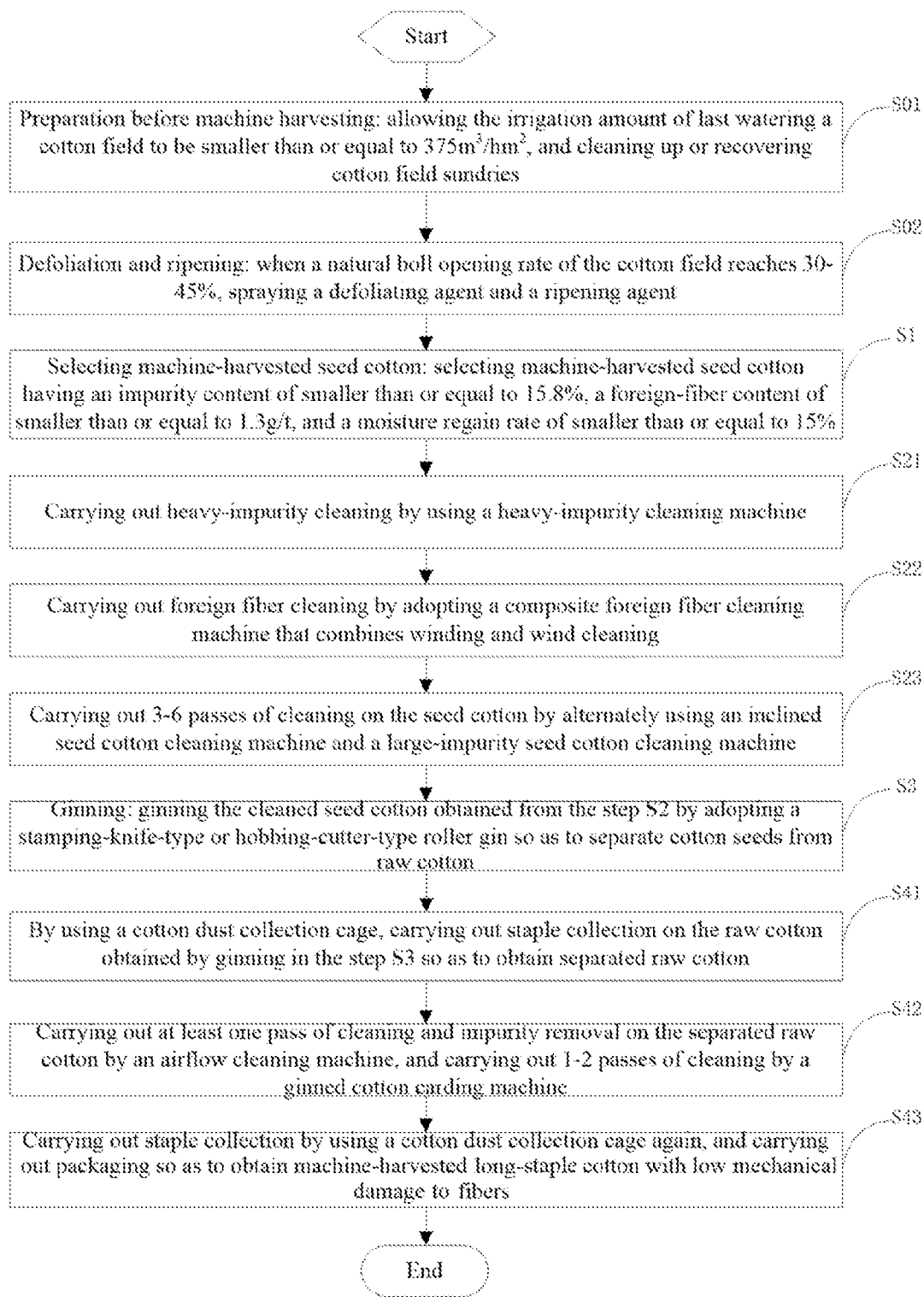
FIG. 1 is a schematic diagram of process steps of a method for producing raw cotton of a machine-harvested long-staple cotton with a modal length of greater than or equal to 35 mm in one embodiment of the present disclosure.

Objective realization, function characteristics, and advantages of the present disclosure will be further illustrated with reference to the drawings in combination with embodiments.

DETAILED DESCRIPTION OF THE EMBODIMENTS

The technical solution of the embodiments will be clearly and completely described below in connection with the drawings in the embodiments. Obviously, the described embodiments are just a part but not all of the embodiments of the present disclosure. Based on the embodiments of the present disclosure, all other embodiments obtained by those of ordinary skill in the art without any inventive work fall within the scope of protection of the present disclosure.

It should be noted that all directional indications (such as "up", "down", "left", "right", "front", "back", etc.) in the embodiments are merely used for explaining a relative positional relationship, motion situations, etc. between components in a certain specific gesture (as shown in the drawings), and if the specific gesture is changed, the directional indications are also correspondingly changed.

In addition, in the present disclosure, description involving the terms such as "first", "second", etc. is merely used for the description objective, but should not be understood as indicating or implying relative importance thereof or implicitly indicating the number of the indicated technical features. Therefore, features defined with the terms such as "first" and "second" can explicitly or implicitly indicate that at least one feature is included. In the description of the present disclosure, the phrase "a plurality of" indicates that there are at least two, e.g., two, three, etc., unless otherwise specifically defined.

In the present disclosure, unless otherwise specifically specified and defined, terms such as "connected", "fixed", etc. should be broadly understood, and for example, "fixed" may be fixedly connected, detachably connected, or integrally connected; may be mechanically connected or electrically connected; or may be directly connected, or may be indirectly connected by an intermediate medium, or may be in internal communication between two components or in an interactive relationship between two components, unless otherwise definitely defined. Those ordinary skilled in the art could understand the specific meanings of the terms above in the present disclosure according to specific situations.

In addition, the technical solutions of the embodiments of the present disclosure can be combined with each other, but it must be based on implementability for those of ordinary skill in the art. When the combination of the technical solutions is mutually contradictory or cannot be implemented, it should be regarded that this combination of the technical solutions does not exist and also does not fall within the scope of protection of the present disclosure.

It should be understood that the specific embodiments described herein are merely used for explaining the present disclosure, but not intended to limit the present disclosure.

Long-staple cotton is named due to long fibers. The long-staple cotton is high in quality, and the fibers thereof are flexible and long and generally have a length of 33-39 mm, and the longest fibers are up to 64 mm; the fibers have a fineness of 7,000-8,500 m/g, a width of 15-16 μm, a high strength of 4-5 gram forces per piece, and a breaking length of 33-40 km, wherein long-staple cotton with a fiber length of 35 mm or above is called as extra-long-staple cotton, and long-staple cotton with a fiber length of 33-35 mm is called as medium-long-staple cotton.

Cotton fibers of sea-island cotton generally belong to the extra-long-staple cotton. The seal-island cotton is native to the tropical regions of South America and the West Indies, and currently, is widely cultivated worldwide. In China, the long-staple cotton is planted in Xinjiang.

Xinjiang sea-island long-staple cotton generally has a fiber length of up to 37 mm or more. by researches, it is indicated that: the higher the fiber length is, the more difficult it is to clean up impurities. In addition, many sundries are often mixed into the seal-island long-staple cotton in the machine harvesting process, and seed cotton thereof has an impurity content of up to 20% or more and contains foreign fibers. When the sea-island long-staple cotton is machined, the impurities, particularly the foreign fibers are difficult to clean up, and it is liable to cause serious fiber mechanical damage and a stringy cotton phenomenon in the machining process. If a conventional cleaning method is adopted, due to high impurity cleaning strength and excessive passes, it is liable to cause reduction of the length of machined raw cotton by 2-4 mm due to the mechanical damage and the foreign fibers cannot be effectively cleaned up, resulting in that finally, the technical requirements for raw material quality of high-end cotton textiles cannot be satisfied.

In order to solve this problem, the present disclosure designs a special method for machining (cleaning up impurities and foreign fibers) sea-island long-staple cotton. According to the method, mechanical damage caused in the machining process can be reduced, and the length and the strength of the machined fibers are guaranteed to still reach relatively high values. Therefore, the method is applicable to machine the sea-island long-staple cotton with the modal length of greater than or equal to 35 mm and particularly applicable to seed cotton of machine-harvested long-staple cotton which has an average impurity content of more than 15% and contains many foreign fibers.

The modal length refers to the length of the group of fibers which accounts for the most weight or the greatest number in the distribution of cotton fiber length.

As shown in FIG. 1 to FIG. 5, the present disclosure provides a method for producing raw cotton of machine-harvested long-staple cotton with a modal length of greater than or equal to 35 mm, including the steps:

S1, machine harvesting and selection of seed cotton: selecting machine-harvested seed cotton having an impurity content of smaller than or equal to 15.8%, a foreign-fiber content of smaller than or equal to 1.3 g/t, and a moisture regain rate of smaller than or equal to 15%.

Wherein, the machine harvesting time may be on October $7^{th}$ to November $11^{th}$ of the current year, a defoliation rate of a cotton field in the machine harvesting process should reach 92-94%, and a boll opening rate reaches 95-98%.

S2, cleaning seed cotton, including:
- S21, carrying out heavy-impurity cleaning by using a heavy-impurity cleaning machine;
- S22, carrying out foreign fiber cleaning by adopting a composite foreign fiber cleaning machine that combines winding and wind cleaning; and
- S23, carrying out 3-6 passes of cleaning on the seed cotton by alternately using an inclined seed cotton cleaning machine and a large-impurity seed cotton cleaning machine.

Specifically, the heavy-impurity cleaning is that boll shells, dead cotton, immature cotton bolls, and sundries with relatively high specific gravities, such as stones, metal, etc., are removed by using the heavy-impurity cleaning machine.

In this embodiment, the foreign fiber cleaning is that by using an uninterrupted composite foreign fiber cleaning machine with winding rods and through the design that two adjacent upper and lower winding rods rotate in opposite directions, seed cotton in a "long" foreign fiber cleaning channel (hereinafter referred to as a channel) is guaranteed to move from top to bottom according to an "S"-shaped trajectory so as to achieve an effect that the winding rods more effectively wind the "long" foreign fibers in the seed cotton and then the foreign fibers are removed. When fully opened seed cotton with the "long" foreign fibers cleaned up enters a foreign fiber separation cavity, at the moment, by wind power generated by wind (from an air inlet) of the foreign fiber separation cavity, the opened seed cotton is thrown up, and foreign materials with lower specific gravities than the seed cotton, which mainly include mulching membranes, animal hair (including feathers), chemical woven bag yarns, plastic sheets, dust, etc., can be separated from the seed cotton so as to be removed.

Preferably, in a specific implementation mode, the step S23 specifically includes: carrying out one pass of cleaning by the inclined seed cotton cleaning machine;

carrying out one pass of cleaning by the large-impurity seed cotton cleaning machine;

carrying out one pass of cleaning by the inclined seed cotton cleaning machine;

carrying out 0 to 1 pass of cleaning by the large-impurity seed cotton cleaning machine; and carrying out 0 to 2 passes of cleaning by two inclined seed cotton cleaning machines arranged in an up-and-down staggered stacking manner.

In this implementation mode, in the production machining method, 5 to 7 passes of cleaning in total are carried out on the seed cotton in the whole process, which are respectively one pass of heavy-impurity cleaning, one pass of foreign fiber cleaning, and 3 to 6 passes of cleaning carried out on the seed cotton by a plurality of (sets of) inclined seed cotton cleaning machines and the large-impurity seed cotton cleaning machine, Wherein, cleaning carried out on the seed cotton by the plurality of (sets of) inclined seed cotton cleaning machine and the large-impurity seed cotton cleaning machine sequentially and respectively is that: 1, one pass of cleaning is carried out by the inclined seed cotton cleaning machine so as to remove part of fine impurities such as leaves, branches, etc., and is accompanied with functions of opening the seed cotton and the like (mandatory); 2, one pass of cleaning is carried out by the large-impurity seed cotton cleaning machine so as to remove 75% or more of large impurities such as boll shells, stems, etc. (mandatory); 3, one pass of cleaning is carried out by the inclined seed cotton cleaning machine so as to remove fine impurities such as leaves, branches, etc., and is accompanied with the functions of opening the seed cotton and the like (mandatory); 4, 0-1 pass of cleaning is carried out by the large-impurity seed cotton cleaning machine so as to remove 95% or more of large impurities such as boll shells, stems, etc. (optionally, one pass of cleaning or no cleaning); and 5, two inclined seed cotton cleaning machines arranged in an up-and-down staggered stacking manner are mounted to carry out 0-2 passes of cleaning on the seed cotton so as to remove fine impurities in the seed cotton, such as leaves, branches, etc., and is accompanied with the function of opening the seed cotton (optionally, one or two inclined seed cotton cleaning machines, or no inclined seed cotton cleaning machine, with a bypass channel design).

S3, ginning: ginning the cleaned seed cotton obtained from the step S2 by adopting a ginning machine selected from a stamping-knife-type or hobbing-cutter-type roller gin so as to separate cotton seeds from raw cotton; and S4, finishing raw cotton, including:

S41, by using a cotton dust collection cage, carrying out staple collection on the raw cotton obtained by ginning in the step S3 so as to obtain separated raw cotton;

S42, carrying out at least one pass of cleaning and impurity removal on the separated raw cotton by an airflow cleaning machine, and carrying out 1-2 passes of cleaning by a ginned cotton carding machine; and S43, carrying out staple collection by using a cotton dust collection cage again, and carrying out packaging so as to obtain machine-harvested long-staple cotton with low mechanical damage to fibers.

Specifically, in this embodiment, in the step S42, 2-4 passes of cleaning are carried out on ginned cotton, and sequentially includes: one pass of cleaning by the airflow cleaning machine (mandatory), and 1-2 passes of impurity cleaning by the ginned cotton cleaning machine (optionally, one or two passes of cleaning).

Figure 2:
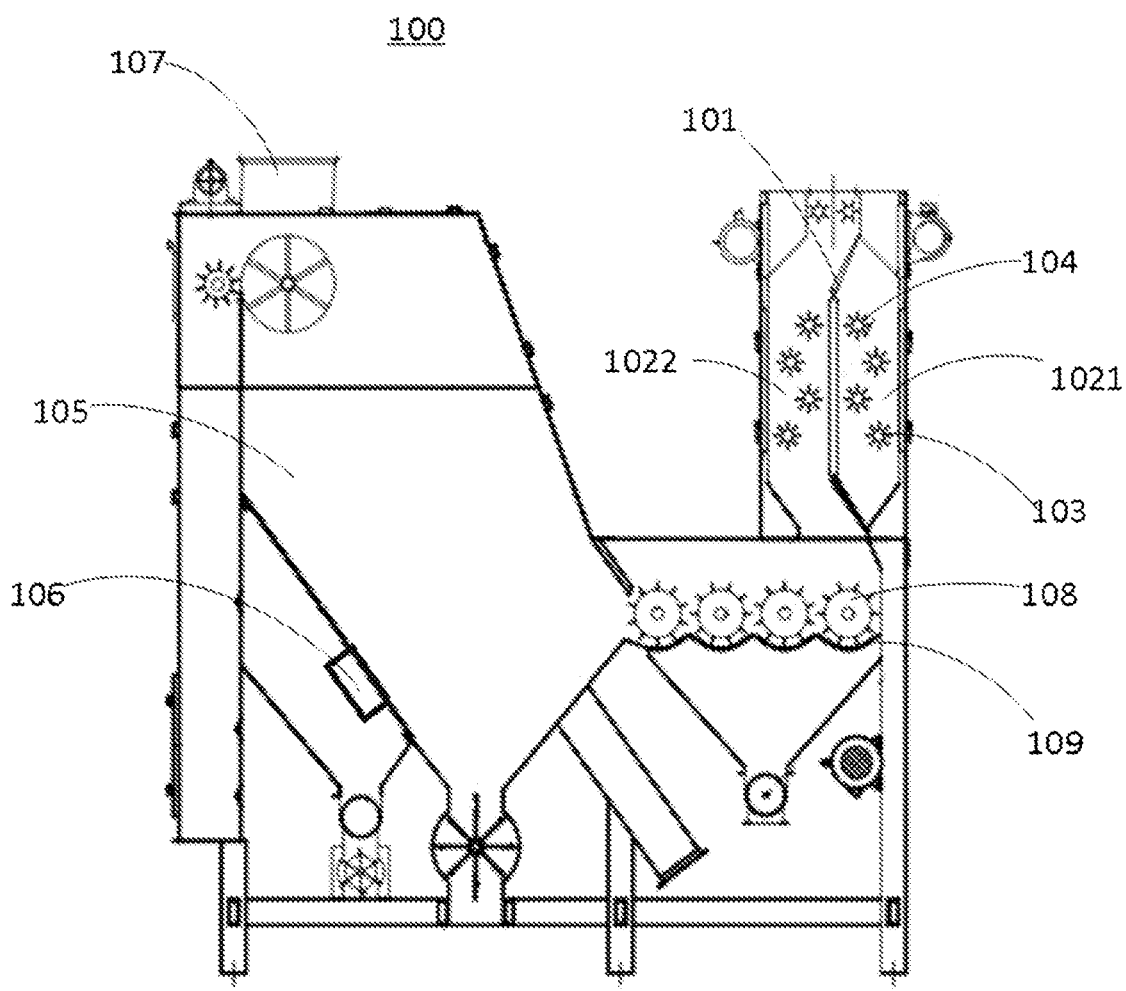
FIG. 2 is a structural schematic diagram of a composite foreign fiber cleaning machine applied in the method for producing the raw cotton of the machine-harvested long-staple cotton with the modal length of greater than or equal to 35 mm according to the present disclosure.

In combination with FIG. 2 together, in this embodiment, the composite foreign fiber cleaning machine adopts a structure having two alternately running channels of winding rods. Specifically, the foreign fiber cleaning machine 100 adopts a double-channel design; by controlling position switching of a cotton feeding plate 101, a one-open and one-closed alternative operation situation of a No. 1 cleaning channel 1021 and a No. 2 cleaning channel 1022 is implemented so as to always keep one channel in an "open state" in which the seed cotton is normally fed; the "long" foreign fibers in the fed seed cotton are effectively wound on the winding rods 103, so that when feeding of the seed cotton in this channel is stopped, the foreign fibers are removed; and for the other channel in which feeding of the seed cotton is stopped, the "long" foreign fibers on the winding rods 103 in the channel can be removed in a case of uninterrupted operation of the foreign fiber cleaning machine 100.

Wherein, by the design that two adjacent upper and lower winding rods 103 rotate in opposite directions, the seed cotton in the "long" foreign fiber cleaning channel is guaranteed to move from top to bottom according to the "S"-shaped trajectory so as to achieve an effect that the winding rods 103 more effectively wind the "long" foreign fibers in the seed cotton and then cleaning is carried out. When fully opened seed cotton with the "long" foreign fibers cleaned up enters a foreign fiber separation cavity 105, at the moment, by wind power generated by wind (from an air inlet 106, and power is from an exhaust fan at a suction opening 107) of the foreign fiber separation cavity 105, the opened seed cotton is thrown up, and foreign materials with lower specific gravities than the seed cotton, which mainly include mulching membranes, animal hair (including feathers), chemical woven bag yarns, plastic sheets, dust, etc., can be separated from the seed cotton so as to be removed.

Specifically, the winding rods 103 in each channel have a diameter of 85-95 mm and a length of 2.5-3.0 m, toothed nails 104 with a length of 30-35 mm are designed on the surface of each winding rod 103, a mounting density of the toothed nails 104 is that four toothed nails 104 are mounted around one cycle of each winding rod 103, the toothed nails 104 have an axial spacing of 90-110 mm, and the toothed nails 104 are arranged in a staggered manner along a peripheral direction; and the winding rods 103 in each channel have a left-right spacing of 154-164 cm and an up-down spacing of 176-187 cm.

3 to 5 plucker rollers 108 with a diameter of 400-420 mm (preferably, a diameter of 400 mm) are designed below the winding rods 103, and spacing bar gratings 109 with a spacing of 9.5-10.5 mm are arranged under the plucker rollers 108. During the operation, when rotating, the plucker rollers 108 not only can open and throw out the seed cotton, but also have a function of cleaning the fine sundries such as leaves, branches, etc., so as to facilitate improving the effects of the subsequent drying and impurity cleaning processes.

The wind power of the foreign fiber cleaning machine 100 is mainly generated by one 11 kw motor. In order to ensure that the wind power of the foreign fiber separation cavity 105 reaches a reasonable value, a mounted fan needs to have a variable frequency speed regulation function so as to not only prevent excessively low wind power, which results in that the foreign materials with low specific gravities and the seed cotton cannot be thrown up to cause failure in foreign material separation, but also prevent excessively high wind power, which results in a phenomenon that the seed cotton is sucked out of the suction opening 107.

Preferably, in one specific embodiment, before the step S21, the step S2 further includes a step S20 of stacking: stacking to-be-machined seed cotton selected in the step S1 for 7-11 d.

Preferably, the method further includes a step S24 between the step S22 and the step S23, namely, when the water content of the to-be-machined seed cotton is 10-17% or the relative humidity of air in a ginning site is 86-96%, drying to-be-machined seed cotton by adopting a drying device which is a drying tower with 13 to 21 layers.

Preferably, after the step S24, when the water content after the to-be-machined seed cotton is dried is still greater than or equal to 12%, drying is carried out again after the seed cotton is cleaned by using the large-impurity seed cotton cleaning machine for the first time in the step S23.

Figure 3:
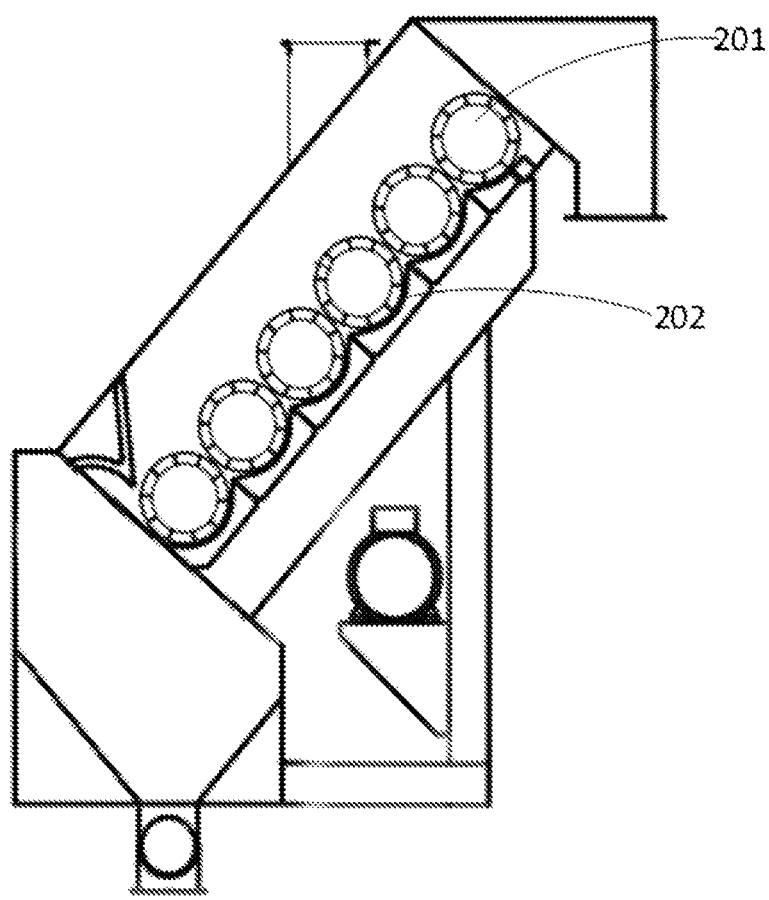
FIG. 3 is a structural schematic diagram of an inclined seed cotton cleaning machine applied in the method for producing the raw cotton of the machine-harvested long-staple cotton with the modal length of greater than or equal to 35 mm according to the present disclosure.

Preferably, in combination with FIG. 3 together, in one specific embodiment, the inclined seed cotton cleaning machine 200 includes 6 toothed nail rollers 201 slantingly arranged in a shell (not shown in the drawing) from top to bottom; each toothed nail roller 201 has a diameter of 420-430 mm, a working linear speed of 8.96-9.32 m/s, and a rotating speed of 400 r/min; toothed nails (not shown in the drawing) mounted on each toothed nail roller 201 have a length of 49-51 mm; each toothed nail is in a form of a slender cone without a cone tip; a semi-ellipsoid at the tip end of each toothed nail has a diameter of 9-10 mm; and a tangent plane at the rear end of each toothed nail has a maximum diameter of 13-14 mm. Specifically, by throwing and carding the seed cotton, the inclined seed cotton cleaning machine 200 prepared before the seed cotton is machined not only cleans up part of fine impurities such as shredded cotton leaves, short branch stems, etc., but also ensures that the to-be-machined seed cotton is sufficiently opened so as to create a beneficial environment for impurity removal. The inclined seed cotton cleaning machine 200 is not provided with a recovery device per se, but is provided with 6 toothed nail rollers; each toothed nail roller adopts a large-diameter design; and the inclined seed cotton cleaning machine 200 is also designed to be provided with spacing bar gratings 202 with a spacing of 9.5-10.5 mm.

Figure 4:
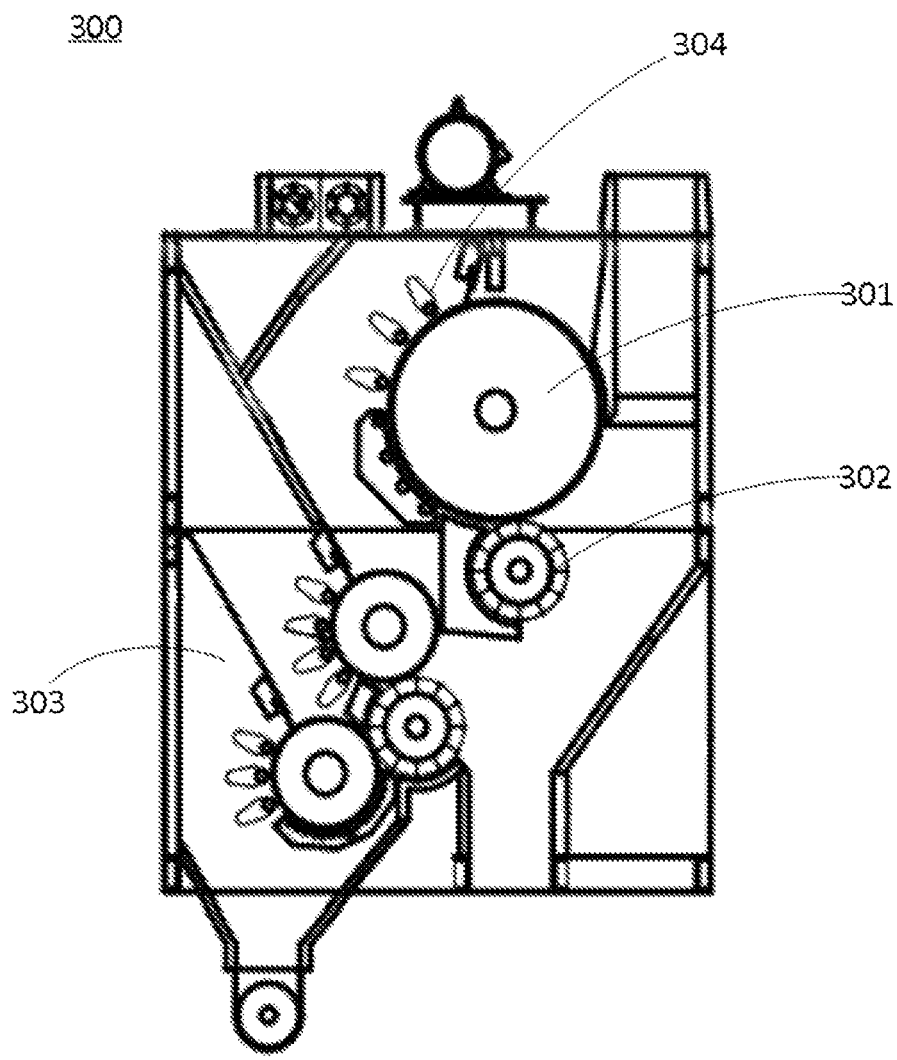
FIG. 4 is a structural schematic diagram of a large-impurity seed cotton cleaning machine applied in the method for producing the raw cotton of the machine-harvested long-staple cotton with the modal length of greater than or equal to 35 mm according to the present disclosure.

Preferably, in combination with FIG. 4 together, in one specific embodiment, the large-impurity seed cotton cleaning machine 300 includes one large roller 301 which is arranged in a shell and is provided with a rack, a cotton brushing device 302 matched with the large roller 301, and one independent recovery device 303, wherein the large roller 301 has a diameter of 860-900 mm. During operation, the large roller 301 has a linear speed of 8.61-8.89 m/s and a rotating speed of 155-165 r/min (preferably, 160 r/min), the cotton brushing device 302 is made of carbon-steel spring wires with a diameter of 0.35-0.5 mm, and the cotton brushing device 302 is equipped with 88-92 bundles (preferably, 90 bundles) of steel wires per meter in length, each bundle includes 60 to 70 steel wires, and a spacing between the bundles is 10.5-11.5 mm, preferably 11 mm; and U-shaped racks 304 at an angle of 55-57° are mounted on the surface of the large roller 301, four racks are mounted per cycle, and the racks have a circumferential spacing of 29.5-30.5 mm, preferably 30 mm.

Wherein motors used by the inclined seed cotton cleaning machine 200 and the large-impurity seed cotton cleaning machine 300 both need to be equipped with variable frequency devices. In the machining process, by adjusting the variable frequency devices of the motors, the rotating speed of the roller can be freely changed so as to implement coordination controllability on the fiber mechanical damage degree and the impurity cleaning strength.

In the impurity deep cleaning procedure, the related optional processes are all implemented by the bypass channel design.

During operation of the preparation process before the seed cotton is ginned, cotton assorting adopts an airflow mode.

Preferably, the roller gin is a stamping-knife-type roller gin or a hobbing-cutter-type roller gin; and during operation, parameters of a coinciding spacing and a dead point spacing of the stamping-knife-type roller gin are adjusted according to a size of gross cottonseeds, wherein the dead point spacing is 42-50% of a waist diameter of the gross cottonseeds, and the coinciding spacing is 47-55% of the dead point spacing.

In addition, before ginning, a hobbing cutter, a fixed cutter, and an arc cutter of the hobbing-cutter-type roller gin or a fixed cutter and a movable cutter of the stamping-knife-type roller gin should be passivated so as to ensure that the cutters (blades) above cannot be in a sharp state; and during ginning, cotton assorting adopts the airflow mode.

Figure 5:
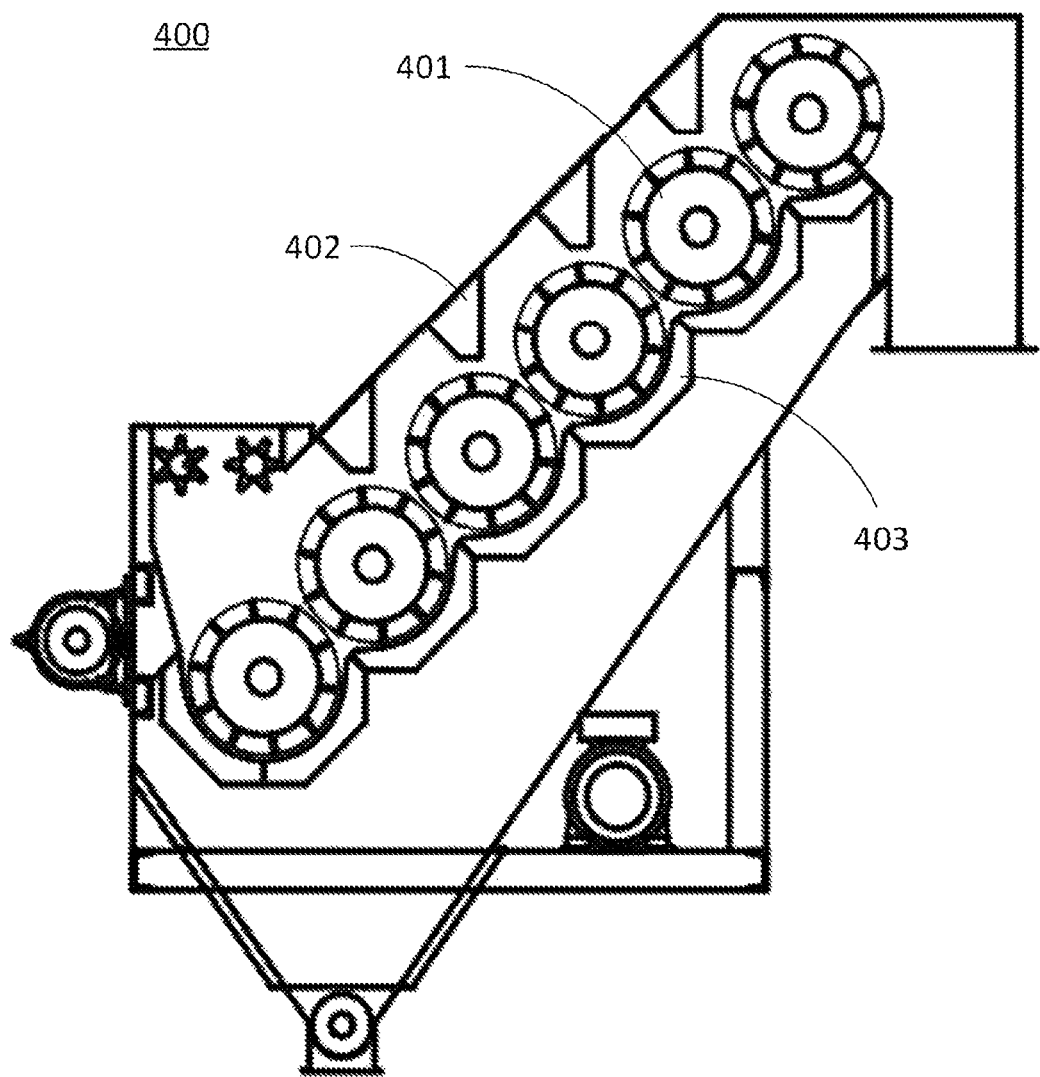
FIG. 5 is a structural schematic diagram of a ginned cotton carding machine applied in the method for producing the raw cotton of the machine-harvested long-staple cotton with the modal length of greater than or equal to 35 mm according to the present disclosure.

Preferably, in combination with FIG. 5 together, the ginned cotton carding machine 400 includes six toothed nail rollers 401 slantingly arranged in a shell from top to bottom, and four cotton baffles 402 each arranged above a gap between two adjacent toothed nail rollers 401 so as to prevent the toothed nail rollers 401 from circularly and disorderly cleaning raw cotton; the toothed nail rollers 401 have a diameter of 320-350 mm, a working linear speed of 8.96-9.32 m/s, and a rotating speed of 450 r/min; toothed nails (not shown in the figure) mounted on each toothed nail roller 401 have a length of 49-51 mm; each toothed nail is in a form of a slender cone without a cone tip; a semi-ellipsoid at the tip end of each toothed nail has a diameter of 7-8 mm; and a tangent plane at the rear end of each toothed nail has a maximum diameter of 9-10 mm. Specifically, the ginned cotton carding machine 400 is designed to be provided with four cotton baffles so as to prevent the ginned cotton carding machine 400 from circularly and disorderly cleaning raw cotton, then causing fiber mechanical damage and generating a large amount of stringy cotton. The ginned cotton carding machine 400 is not provided with a recovery device per se, but is provided with six toothed nail rollers so as to facilitate cleaning up impurities in ginned cotton and generate small mechanical damage to the ginned cotton, and equipped spacing bar gratings 403 have a spacing of 7.5-11.5 mm.

In addition, due to the insufficient heat resources in part of extra-long-staple cotton or sea-island long-staple cotton planting regions, the planted extra-long-staple cotton generally needs to be artificially ripened, and additionally, a large amount of extra-long-staple cotton shows the characteristics of large leaves and a large amount of fluff of a leaf shape in the mature period and an excessively compact plant type, resulting in that the sea-island long-staple cotton is insensitive to a defoliating agent and a ripening agent, which causes poor effects of the conventional defoliating and ripening technologies and seriously affects production of the machine-harvested long-staple cotton.

Therefore, the present disclosure also provides a planting method for sea-island long-staple cotton, and performs systematic researches on some key links in the planting links, so that on one hand, the quality of seed cotton is ensured, and on the other hand, the sea-island long-staple cotton is more suitable for the machine-harvesting operation. The planting method for the sea-island long-staple cotton, which is provided by the present disclosure, is based on the researches of the inventor of the present disclosure on the Xinjiang sea-island long-staple cotton, and is also applicable to long-staple cotton planting in other cotton planting countries (particularly, regions in which the planting environments are similar with those in Xinjiang of China).

The planting method for the long-staple cotton, which is provided by the present disclosure, includes:

S01, preparation before machine harvesting: allowing the irrigation amount of last watering a cotton field to be smaller than or equal to 375 m$^3$/hm$^2$, and cleaning up or recovering cotton field sundries. For example, sundries in a cotton field watered with drip watering are recovered; and specifically, weeds, delivery pipe branches, scattered and dissociated drip watering tapes, residual membranes, and other sundries which may pollute the seed cotton or influence the machine-harvesting operation in the cotton field need to be cleaned up or recovered, or the sundries above are buried with soil without recovering mulching membranes and drip watering tapes in an unscattered and undissociated state; and S02, defoliation and ripening: when a natural boll opening rate of the cotton field reaches 30-45%, and a duration of cotton bolls at the upper portion reaches 35-50 d, spraying the defoliating agent and the ripening agent.

Specifically, the planting method further includes: choosing sea-island long-staple cotton with middle-sized or/and small leaves, the front and back surfaces of the leaves having an intermediate or small amount of fluff or having no fluff, a plant type being a mixed type or a properly loosened type, the lowest ground clearance of blooming bolls being greater than or equal to 18 cm, a final main stem having a thickness of 9.8-11.8 mm, plants in a boll period being not prone to lodging, a fiber length of greater than or equal to 37 mm, and a specific strength of greater than or equal to 42.5 cN/tex.

The planting method further includes plant and row spacing configuration which specifically includes: during sowing, adopting a wide-narrow row planting mode or an equal row spacing planting mode. Preferably, a plant spacing is 6.5-11.8 cm; for example, when the wide-narrow row planting mode is selected, on the premise that a wide row+a narrow row=76 cm, a row spacing between wide rows is 64-66 cm, a row spacing between corresponding narrow rows is 12-10 cm, or on the premise that a wide row+a narrow row=76 cm, a row spacing between wide rows is 72 cm, a row spacing between narrow rows is 4 cm, and a plant spacing is 10.5-11.8 cm; and when the equal row spacing planting mode is selected, a row spacing is 76 cm, and a plant spacing is 6.5-8.5 cm.

In the step S01 the irrigation amount of last watering the cotton field is smaller than or equal to 375 m$^3$/hm$^2$. When drip watering is used for the cotton field, the mulching membranes and the drip watering tapes in the cotton field are not recovered, but weeds, delivery pipe branches, scattered and dissociated drip watering tapes, residual membranes, and other sundries which may pollute the seed cotton or influence the machine-harvesting operation in the cotton field watered with drip watering need to be cleaned up or recovered, or the sundries above are buried with soil.

Wherein weather selection conditions in the step S02 are that: no rain falls in 24 h after the defoliating agent and the ripening agent are sprayed, the lowest air temperature in 3 to 5 days is 10-15° C., and the daily mean temperature in 7 to 10 days is 18-21° C.;

the defoliating agent is thidiazuron or a thidiazuron complex preparation, and the ripening agent is ethephon;

in the step S02, the defoliating agent and the ripening agent are sprayed to the cotton field twice; and a spraying solution of the defoliating agent and the ripening agent in the step S02 is selected from one of the following solutions:

a first solution: for the first time, spraying 450 mL/hm$^2$ of 50% thidiazuron, 900 mL/hm$^2$ of 40% aqueous ethephon, and an assistant; and for the second time, after 7-10 d, spraying 300 mL/hm$^2$ of 50% thidiazuron, 600 mL/hm$^2$ of 40% aqueous ethephon, and an assistant; and a second solution: for the first time, spraying 120 mL/hm$^2$ of a suspending agent thidiazuron & diuron, 480 mL/hm$^2$ of an assistant alkyl ethyl sulfonate, and 450 mL/hm$^2$ of 40% aqueous ethephon; and for the second time, after 7-10 d, spraying 150 mL/hm$^2$ of thidiazuron & diuron, 600 mL/hm$^2$ of alkyl ethyl sulfonate, and 1,050 mL/hm$^2$ of 40% aqueous ethephon, wherein the total active ingredient content of the suspending agent thidiazuron & diuron is 540 g/L, wherein the diuron content is 180 g/L, and the thidiazuron content is 360 g/L; and the active ingredient content of the assistant alkyl ethyl sulfonate is 280 g/L, and a dosage form of the assistant alkyl ethyl sulfonate is a soluble concentrate.

Wherein in the defoliation and ripening step, when a natural boll opening rate of the cotton field reaches 30-45% and preferably, a duration of cotton bolls at the upper portion reaches 35-50 d, the defoliating agent and the ripening agent are sprayed. The time when the defoliating agent and the ripening agent are sprayed for the first time may be on September 14$^{th}$ to September 19$^{th}$. If the natural defoliation degree of the cotton field has reached 30% or more before September 14$^{th}$, the defoliating agent and the ripening agent are sprayed once according to the first application method in any one of the solutions.

These technical solutions proposed by the present disclosure relate to cotton variety selection, plant and row spacing matching, defoliation and ripening, preparation before machine harvesting, or creative designs of key equipment and technologies thereof involved in production links such as machining equipment and processes thereof, including equipment improvement, parameter determination, research and development of the processes and related technologies, etc., and establish a production method applicable to the row cotton of the machine-harvested long-staple cotton with the modal length of greater than or equal to 35 mm.

According to the raw cotton of the machine-harvested long-staple cotton obtained by using the production method of the present disclosure, the following main quality indexes are achieved: a fiber length is 36.5-38.4 mm, a specific strength is 42.3-46.1 cN/tex, a uniformity is 86.2-87.0%, a foreign-fiber content is 0.2-0.4 g/t, and an impurity content is 2.6-3.4%. There is no obvious quality difference in the indexes of the fiber length, the specific strength, and the uniformity between the row cotton of the machine-harvested long-staple cotton and normal hand-picked sea-island raw cotton, and the foreign fiber pollution of the row cotton of the machine-harvested long-staple cotton is obviously lower than that of the hand-picked cotton, but the impurity content of the row cotton of the machine-harvested long-staple cotton is slightly higher than that of the hand-picked cotton. After cotton-spinning enterprises use the row cotton of the machine-harvested long-staple cotton, a conclusion that the sea-island raw cotton produced by the method can satisfy the requirements for spinning high-end cotton textiles is verified.

Therefore, the method is helpful for promoting popularization and application of the sea-island cotton machine harvesting technology and ensuring sustainable development of the sea-island cotton, so that not only can the situation of the declined trend of Xinjiang of China on production of the sea-island cotton be turned, but also the method of the present disclosure can be applicable to production of similar machine-harvested sea-island long-staple cotton with the fiber length of greater than or equal to 35 mm in other cotton planting countries.

Description will be made below in combination with specific experimental data:

Embodiment 1

This embodiment is implemented in the main cotton planting and production county (Awati County) of Xinjiang long-staple cotton in 2019 to 2021. Specifically, implementation is completed by two units of the Awati Xinya Cotton Industry Co., Ltd. and the Fengyuan Technology Co., Ltd., Awati County Agricultural Science Academy built in this county.

All technologies involved in this embodiment are completely made by the inventor, and under the guidance of the inventor of the present application, the work is carried out strictly according to the method in Claims and Application of the present disclosure. According to this embodiment, cotton fields of sea-island long-staple cotton are located in a cotton breeding base of the Xinjiang Agricultural Science Academy in Yuman Village, Boshilike Town, Awati County, and the Duolangkuideman reclamation area of Awati County, wherein the Awati Xinya Cotton Industry Co., Ltd. takes charge of implementing a machining method for seed cotton of the machine-harvested sea-island long-staple cotton, the Institute of Economic Crops, Xinjiang Academy of Agricultural Sciences takes charge of implementing a planting method for the sea-island long-staple cotton, and technical directors are three experts or technicians, i.e., Liwen Tian, Guoling Ni, and Bin Zhu.

All the technologies of this embodiment are completely made by the inventor, and under the guidance of the inventor of the present application, the work is carried out strictly according to the method in Claims and the Description of the present disclosure. The method includes steps: cotton planting, seed cotton machine harvesting and selection, and redesign/positioning/making of a seed cotton machining process and important components/functions/operation parameters of key equipment of the seed cotton machining process, wherein the seed cotton machining process sequentially includes: stacking, cotton feeding, heavy-impurity cleaning, foreign fiber cleaning, drying, impurity deep cleaning, ginning, and finishing of ginned raw cotton.

Main implemented technical contents are as follows:

(1) Cotton Planting

In 2019

Variety selection: a cotton field with a planting area of 88.33 hm$^2$ is selected in the cotton breeding base of the Xinjiang Agricultural Science Academy. One variety is selected, the variety is named as new No. 78; the variety has a growth period of 130 d; and the variety is a sea-island long-staple cotton variety with middle-sized leaves, the front and back surfaces of the leaves having a small amount of fluff, a plant type being a mixed type, the average lowest ground clearance of blooming bolls at the lowermost portions of cotton plants being 18.3 cm, a final main stem having a diameter of 10.2 mm, plants in a boll period being not prone to lodging, a fiber length of 37.9 mm, and a specific strength of 43.7 cN/tex.

Setting of plant and row spacing and density: a wide-narrow row planting mode is adopted, a row spacing between wide rows is 66 cm, a row spacing between narrow rows is 10.0 cm, a plant spacing is 10.6 cm, a density is 248,250 plants/hm$^2$, and a corresponding conventional matching technology is adopted so as to ensure full stand after once sowing.

Preparation before machine harvesting: the time of stopping watering of most of cotton fields is from August 12$^{th}$ to August 25$^{th}$, and the time of stopping watering of about 6.67 hm$^2$ of a sandy land is from September 4$^{th}$ to September 5$^{th}$; the irrigation amount of last watering a common cotton field is 270-330 m$^3$/hm$^2$, and the irrigation amount of last watering the sandy land is 270-330 m$^3$/hm$^2$; before machine harvesting, field weeds are removed, meanwhile, delivery pipe branches in the cotton field watered with drip watering are recovered, and scattered and dissociated drip watering tapes, residual membranes, and other sundries which may pollute seed cotton or influence the machine-harvesting operation are cleaned up; sundries inconvenient to take out are buried with soil; and any recovery operation is not carried out on mulching membranes and drip watering tapes in the cotton field.

Defoliation and ripening: a natural boll opening rate of the cotton field reaches 32-40%; a duration of cotton bolls at the upper portion reaches 37-42 d; the time when a defoliating agent and a ripening agent are sprayed for the first time may be on September 15$^{th}$ to September 17$^{th}$; no rain falls in several days after the defoliating agent and the ripening agent are sprayed; the lowest air temperature in 3 to 5 days is 14.2° C.; and the daily mean temperature in 7 to 10 days is 20.6° C.

A spraying method: for the first time, 450 mL/hm$^2$ of 50% thidiazuron, 900 mL/hm$^2$ of 40% aqueous ethephon, and an assistant are sprayed; and for the second time, after 7-10 d, 300 mL/hm$^2$ of 50% thidiazuron, 600 mL/hm$^2$ of 40% aqueous ethephon, and an assistant are sprayed, wherein a natural defoliation degree of about 80 mu of the cotton field has reached 32% or more before September 14$^{th}$, and the defoliating agent and the ripening agent are sprayed once according to the first application method.

Machine harvesting: the machine harvesting time is on October 7$^{th}$ to November 15$^{th}$ of the current year, a defoliation rate of the cotton field in the machine-harvesting process should reach 92-94%, and a boll opening rate reaches 95-97%.

A machine-harvesting operation speed is controlled within a range of 3.5-4.0 km/h, and a John Deere cotton picker with a total loss rate of 3.16% is selected, wherein the percentage of knocked down cotton is 1.32%, the percentage of leaved cotton is 0.89%, the percentage of cotton hung on plants is 0.94%, and a total collect rate is 96.84%.

For machine-harvested seed cotton, an impurity content is 13.4-15.2%, a foreign-fiber content is 0.2-0.3 g/t, and a moisture regain rate is 10.2-13.5%.

In 2020

Variety selection: a cotton field with a planting area of 152 $hm^2$ is selected in the cotton breeding base of the Xinjiang Agricultural Science Academy. One variety is selected, the variety is named as new No. K432; the variety has a growth period of 135 d; and the variety is a sea-island long-staple cotton variety with middle-sized and small leaves, the front and back surfaces of the leaves having a small amount of fluff, a plant type being a properly loosened type, the lowest ground clearance of blooming bolls at the lowermost portions of cotton plants being 18.8 cm, a final main stem having a diameter of 11.7 mm, plants in a boll period being not prone to lodging, a fiber length of 39.5 mm, and a specific strength of 45.9 cN/tex.

Setting of plant and row spacing and density: a wide-narrow row planting mode is adopted, a row spacing between wide rows is 66 cm, a row spacing between narrow rows is 10.0 cm, a plant spacing is 11.5 cm, a density is 228,750 plants/$hm^2$, and a corresponding conventional matching technology is adopted so as to ensure full stand after once sowing.

Preparation before machine harvesting: the time of stopping watering of most of cotton fields is from August $20^{th}$ to August $27^{th}$, and the time of stopping watering of about 14 $hm^2$ of a sandy land is from September $6^{th}$ to September $8^{th}$; the irrigation amount of last watering a common cotton field is 300-375 $m^3/hm^2$, and the irrigation amount of last watering the sandy land is 270-575 $m^3/hm^2$; before machine harvesting, field weeds are removed, meanwhile, delivery pipe branches in the cotton field watered with drip watering are recovered, and scattered and dissociated drip watering tapes, residual membranes, and other sundries which may pollute seed cotton or influence the machine-harvesting operation are cleaned up; sundries inconvenient to take out are buried with soil; and any recovery operation is not carried out on mulching membranes and drip watering tapes in the cotton field.

Defoliation and ripening: a natural boll opening rate of the cotton field reaches 36-45%; a duration of cotton bolls at the upper portion reaches 36-48 d; the time when a defoliating agent and a ripening agent are sprayed for the first time may be on September $16^{th}$ to September $19^{th}$; no rain falls in several days after the defoliating agent and the ripening agent are sprayed; the lowest air temperature in 3 to 5 days is 13.6° C.; and the daily mean temperature in 7 to 10 days is 19.6° C.

A spraying method: for the first time, 120 mL/$hm^2$ of a suspending agent thidiazuron & diuron (the total active ingredient content is 540 g/L, wherein the diuron content is 180 g/L, and the thidiazuron content is 360 g/L), 480 mL/$hm^2$ of an assistant alkyl ethyl sulfonate (the active ingredient content is 280 g/L, and a dosage form is a soluble concentrate), and 450 mL/$hm^2$ of 40% aqueous ethephon are sprayed; and on September $24^{th}$, after 7-10 d, when defoliation and ripening are carried out for the second time, 150 mL/$hm^2$ of thidiazuron & diuron, 600 mL/$hm^2$ of alkyl ethyl sulfonate, and 1,050 mL/$hm^2$ of 40% aqueous ethephon are sprayed.

A natural defoliation degree of about 120 mu of the cotton field has reached 37% or more before September $13^{th}$, and spraying is carried out once according to the first application method in the defoliation and ripening solution.

Machine harvesting: the machine harvesting time is on October $15^{th}$ to November $7^{th}$ of the current year, a defoliation rate of the cotton field in the machine-harvesting process should reach 92-94%, and a boll opening rate reaches 96-98%.

A machine-harvesting operation speed is controlled within a range of 3.5-4.0 km/h, and a John Deere cotton picker with a total loss rate of 3.42% is selected, wherein the percentage of knocked down cotton is 1.41%, the percentage of leaved cotton is 0.92%, the percentage of cotton hung on plants is 1.09%, and a total collect rate is 96.84%.

For machine-harvested seed cotton, an impurity content is 12.9-15.8%, a foreign-fiber content is 0.2-0.4 g/t, and a moisture regain rate is 11.4-14.5%.

In 2021

Variety selection: cotton fields with a total planting area of 556.67 $hm^2$ are selected in the cotton breeding base of the Xinjiang Agricultural Science Academy in Yuman Village, Boshilike Town, Awati County, and the Duolangkuideman reclamation area of Awati County. Three varieties are selected, the varieties are respectively named as new No. 78, new No. K432, and No. K426; planting areas of each variety sequentially and respectively are 280.67 $hm^2$, 186.67 $hm^2$, and 89.33 $hm^2$, wherein the variety No. K426 has a growth period of 133 d and is a sea-island long-staple cotton variety with middle-sized and small leaves, the front and back surfaces of the leaves having a small amount of fluff, a plant type being a mixed type, the lowest ground clearance of blooming bolls being 19.1 cm, a final main stem having a diameter of 11.2 mm, plants in a boll period being not prone to lodging, a fiber length of 38.7 mm, and a specific strength of 45.2 cN/tex.

Setting of plant and row spacing and density: three types of plant spacings, three types of row spacings, and three types of densities are set in total, and respectively are:

1. a common wide-narrow row planting mode: the planting area is 381.33 $hm^2$, a row spacing between wide rows is 66 cm, a row spacing between narrow rows is 10.0 cm, a plant spacing is 11.5 cm, a density is 228,750 plants/$hm^2$, and a corresponding conventional matching technology is adopted so as to ensure full stand after once sowing;
2. a super wide-narrow row planting mode: the planting area is 93.33 $hm^2$, a row spacing between wide rows is 72.0 cm, a row spacing between narrow rows is 4.0 cm, a plant spacing is 11.2 cm, a density is 247,950 plants/$hm^2$, and a corresponding conventional matching technology is adopted so as to ensure full stand after once sowing; and
3. an equal row spacing planting mode: the planting area is 82 $hm^2$, a row spacing is 76 cm, a plant spacing is 6.8 cm, a density is 193,350 plants/$hm^2$, and a corresponding conventional matching technology is adopted so as to ensure full stand after once sowing Preparation before machine harvesting: the time of stopping watering of most of cotton fields is from August $22^{nd}$ to August $30^{th}$, and the time of stopping watering of about 10 $hm^2$ of the sandy land is from September $4^{th}$ to September $5^{th}$; the irrigation amount of last watering a common cotton field is 300-345 $m^3/hm^2$, and the irrigation amount of last watering the sandy land is 270-300 m³/hm²; before machine harvesting, field weeds are removed, meanwhile, delivery pipe branches in the cotton field watered with drip watering are recovered, and scattered and dissociated drip watering tapes, residual membranes, and other sundries which may pollute seed cotton or influence the machine-harvesting operation are cleaned up; sundries inconvenient to take out are buried with soil; and any recovery operation is not carried out on mulching membranes and drip watering tapes in the cotton fields.

Defoliation and ripening: a natural boll opening rate of the cotton field reaches 35-40%; a duration of cotton bolls at the upper portion reaches 40-45 d; the time when a defoliating agent and a ripening agent are sprayed for the first time may be on September 14$^{th}$ to September 16$^{th}$; no rain falls in several days after the defoliating agent and the ripening agent are sprayed; the lowest air temperature in 3 to 5 days is 14.6° C.; and the daily mean temperature in 7 to 10 days is 20.5° C.

A spraying method for about 40% of the cotton fields during defoliation and ripening is that: for the first time, 120 mL/hm² of a suspending agent thidiazuron & diuron (the total active ingredient content is 540 g/L, wherein the diuron content is 180 g/L, and the thidiazuron content is 360 g/L), 480 mL/hm² of an assistant alkyl ethyl sulfonate (the active ingredient content is 280 g/L, and a dosage form is a soluble concentrate), and 600 mL/hm² of 40% aqueous ethephon are sprayed; and on September 24$^{th}$, after 7-10 d, when defoliation and ripening are carried out for the second time, 150 mL/hm² of thidiazuron & diuron, 600 mL/hm² of alkyl ethyl sulfonate, and 1,050 mL/hm² of 40% aqueous ethephon are sprayed.

A natural defoliation degree of about 120 mu of the cotton field has reached 37% or above before September 13$^{th}$, and spraying is carried out once according to the first application method in the defoliation and ripening solution.

A spraying method for 60% of the cotton fields during defoliation and ripening is that: for the first time, 450 mL/hm² of 50% thidiazuron, 900 mL/hm² of 40% aqueous ethephon, and an assistant are sprayed; and for the second time, after 7-10 d, 300 mL/hm² of 50% thidiazuron, 600 mL/hm² of 40% aqueous ethephon, and an assistant are sprayed, wherein a natural defoliation degree of about 5.33 hm² of the cotton field has reached 32% or more before September 14$^{th}$, and the defoliating agent and the ripening agent are sprayed once according to the first application method. The machine harvesting time is on October 25$^{th}$ to November 11$^{th}$ of the current year, a defoliation rate of the cotton fields in the machine-harvesting process should reach 93-94%, and a boll opening rate reaches 96-98%.

Machine harvesting: a machine-harvesting operation speed is controlled within a range of 3.5-4.0 km/h, and a John Deere cotton picker with a total loss rate of 3.7% is selected for about ⅔ of cotton fields, wherein the percentage of knocked down cotton is 1.48%, the percentage of leaved cotton is 0.91%, the percentage of cotton hung on plants is 1.31%, and a total collect rate is 96.5%.

Wherein a Boshiran cotton picker with a total loss rate of 3.27% is selected for about ⅓ of cotton fields, wherein the percentage of knocked down cotton is 1.56%, the percentage of leaved cotton is 1.01%, the percentage of cotton hung on plants is 0.7%, and a total collect rate is 96.8%.

For machine-harvested seed cotton, an impurity content is 14.2-15.1%, a foreign-fiber content is 0.3-0.4 g/t, and a moisture regain rate is 13.5-15.0%.

(2) Seed Cotton Machining

Seed cotton machining is implemented in ginning factories of the Awati Xinya Cotton Industry Co., Ltd. and the Fengyuan Technology Co., Ltd., Awati County Agricultural Science Academy, strictly with reference to the technologies in the embodiment of the present disclosure.

As the Xinjiang long-staple cotton is cotton that is the most difficult to process and clean, the greater the number of passes of cleaning is, the higher an impurity cleaning rate, but meanwhile, the higher the mechanical damage to the cotton is, and in addition, the higher a machine running speed is, the mechanical damage to the cotton is. Therefore, machining personnel needs to flexibly regulate and control cotton cleaning times and a machining speed on site according to the situation of the seed cotton and the market demands by controlling opening and closing of a bypass channel and a motor variable frequency device so as to find out a scientific and reasonable cleaning balance point.

A general principle is that the high an impurity content in the seed cotton is, the higher the moisture regain rate is, and the later the machining time is, so the number of passes of cleaning the seed cotton needs to be greater. Generally, before the middle ten days and the last ten days of November, except for cloudy and rainy days, a drying device commonly is not started; and after the middle ten days and the last ten days of November and on the previous cloudy and rainy days, the drying device needs to be started. On heavy rainy and heavy snowy days, machining cannot be performed.

During machining of the machine-harvested sea-island long-staple cotton, 7-11 passes of cleaning in total are carried out on the seed cotton and ginned cotton.

Wherein 5-8 passes of cleaning are carried out on the seed cotton, and include one pass of heavy-impurity cleaning, one pass of foreign fiber cleaning, and 3 to 6 passes of cleaning carried out on the seed cotton by a plurality of (sets of) inclined seed cotton cleaning machines and a large-impurity seed cotton cleaning machine. Cleaning carried out on the seed cotton by the plurality of (sets of) inclined seed cotton cleaning machines and the large-impurity seed cotton cleaning machine sequentially and respectively is that: 1, one pass of cleaning is carried out by the inclined seed cotton cleaning machine so as to remove part of fine impurities such as leaves, branches, etc., and is accompanied with functions of opening the seed cotton and the like (mandatory); 2, one pass of cleaning is carried out by the large-impurity seed cotton cleaning machine so as to remove 75% or more of large impurities such as boll shells, stems, etc. (mandatory); 3, one pass of cleaning is carried out by the inclined seed cotton cleaning machine so as to remove fine impurities such as leaves, branches, etc., and is accompanied with the functions of opening the seed cotton and the like (mandatory); 4, 0-1 pass of cleaning is carried out by the large-impurity seed cotton cleaning machine so as to remove 95% or more of large impurities such as boll shells, stems, etc. (optionally, one pass of cleaning or no cleaning); and 5, two inclined seed cotton cleaning machines arranged in an up-and-down staggered stacking manner are mounted to carry out 0-2 passes of cleaning on the seed cotton so as to remove fine impurities in the seed cotton, such as leaves, branches, etc., and is accompanied with the function of opening the seed cotton (optionally, one or two inclined seed cotton cleaning machines, or no inclined seed cotton cleaning machine, with a bypass channel design).

2-3 passes of cleaning are carried out on the ginned cotton, and include: one pass of cleaning is carried out on fine impurities, such as leaves, branches, etc. by an airflow cleaning machine, and 1-2 passes of cleaning are carried out on fine impurities, such as leaves, branches, etc. by a ginned cotton carding machine.

Generally, before the middle ten days and the last ten days of November, after 7-10 passes of cleaning in total are carried out on the seed cotton and the ginned cotton, 8-11 passes of cleaning are carried out. Except for cloudy and rainy days, the drying device commonly is not started; and after the middle ten days and the last ten days of November and on the previous cloudy and rainy days, the drying device needs to be started. On heavy rainy and heavy snowy days, machining cannot be performed.

Implementation Result:

Raw cotton obtained by organizing production according to the method in this embodiment is randomly sampled, and raw cotton produced by surrounding ginning factories for machining and operating artificial-picked sea-island long-staple cotton (except for machine-harvested sea-island long-staple cotton test demonstration machining developed by the team of the present disclosure, all of other ginning factories are production lines for machining artificial-picked sea-island long-staple cotton) is taken as a control. A sampling method includes: selecting 3-4 batches of raw cotton in the embodiments and the surrounding controls thereof every year, with 2-3 samples for each batch; and sending raw cotton technical indexes involved in measurement to the local fiber department for measurement, wherein data in the table is all subject to multi-year average numbers measured from the samples, and is specifically shown in Table 1.

TABLE 1

Implementation effect table of the method of the present disclosure

| Items | Embodiment 1 | Surrounding control | Compared with the control | Embodiment 2 | Surrounding control | Compared with the control | Average change |
|---|---|---|---|---|---|---|---|
| Fiber length (mm) | 38.4 | 38.8 | −0.4 | 36.5 | 36.1 | +0.3 | −0.1 |
| Specific strength (cN/tex) | 46.1 | 46.7 | −0.6 | 42.3 | 42.1 | +0.2 | −0.4 |
| Micronaire value | 4.5 | 4.5 | 0 | 4.3 | 4.4 | −0.1 | 0 |
| Uniformity (%) | 86.2 | 86.6 | −0.4 | 87.0 | 86.7 | +0.3 | −0.1 |
| Foreign fiber content (g/t) | 0.4 | 0.7 | −0.3 | 0.2 | 0.8 | −0.6 | −0.5 |
| Impurity content (%) | 3.4 | 2.6 | +0.8 | 2.6 | 2.2 | 0.4 | +0.6 |

Results show that: ginned cotton fibers obtained by using the production method according to the present disclosure have the main quality indexes of: a fiber length is 36.5-38.4 mm, a specific strength is 42.3-46.1 cN/tex, a uniformity is 86.2-87.0%, a foreign-fiber content is 0.2-0.4 g/t, and an impurity content is 2.6-3.4%. There is no obvious quality difference from normal hand-picked cotton. After cotton-spinning enterprises use the raw cotton of machine-harvested long-staple cotton, the following conclusion is verified: the sea-island raw cotton capable of satisfying the quality requirements for spinning high-end cotton textiles is produced successfully by the method. Further because the production cost is greatly reduced by adopting the method of the present disclosure, sustainable development of the sea-island long-staple cotton will be certainly promoted.

The above are merely preferred embodiments of the present disclosure, but not intended to limit the patent scope of the present disclosure. All equivalent structure or equivalent flow transformations made according to the contents in the Description and the Drawings of the present disclosure or directly or indirectly applied in other related technical fields similarly fall within the scope of patent protection of the present disclosure.

What is claimed is:

1. A method for producing raw cotton of machine-harvested long-staple cotton with a modal length of greater than or equal to 35 mm, comprising the steps:
   S0, planting cotton, comprising:
   S01, preparation before machine harvesting: allowing the irrigation amount of last watering a cotton field to be smaller than or equal to 375 $m^3/hm^2$, and cleaning up or recovering cotton field sundries; and
   S02, defoliation and ripening: when a natural boll opening rate of the cotton field reaches 30-45%, spraying a defoliating agent and a ripening agent;
   S1, selecting machine-harvested seed cotton: selecting machine-harvested seed cotton having an impurity content of smaller than or equal to 15.8%, a foreign-fiber content of smaller than or equal to 1.3 g/t, and a moisture regain rate of smaller than or equal to 15%;
   S2, cleaning seed cotton, comprising:
   S21, carrying out heavy-impurity cleaning by using a heavy-impurity cleaning machine;
   S22, carrying out foreign fiber cleaning by adopting a composite foreign fiber cleaning machine that combines winding and wind cleaning, wherein the composite foreign fiber cleaning machine adopts a structure having two alternately running channels of winding rods; winding rods in each channel have a diameter of 85-95 mm and a length of 2.5-3.0 m, toothed nails with a length of 30-35 mm are designed on the surface of each winding rod, a mounting density of the toothed nails is that four toothed nails are mounted around one cycle of each winding rod, the toothed nails have an axial spacing of 90-110 mm, and the toothed nails are arranged in a staggered manner along a peripheral direction; the winding rods in each channel have a left-right spacing of 154-164 cm and an up-down spacing of 176-187 cm; and 3 to 5 plucker rollers with a diameter of 400-420 mm are designed below the winding rods, and spacing bar gratings with a spacing of 9.5-10.5 mm are arranged under the plucker rollers; and
   S23, carrying out 3-6 passes of cleaning on the seed cotton by alternately using an inclined seed cotton cleaning machine and a large-impurity seed cotton cleaning machine, wherein the inclined seed cotton cleaning machine comprises 6 toothed nail rollers slantingly arranged in a shell from top to bottom, each toothed nail roller has a diameter of 420-430 mm, a working linear speed of 8.96-9.32 m/s, and a rotating speed of 400 r/min, toothed nails mounted on each toothed nail roller have a length of 49-51 mm, each toothed nail is in a form of a slender cone without a cone tip, a semi-ellipsoid at the tip end of each toothed nail has a diameter of 9-10 mm, and a tangent plane at the rear end of each toothed nail has a maximum diameter of 13-14 mm; the inclined seed cotton cleaning machine further comprises spacing bar gratings with a spacing of 9.5-10.5 mm; and the large-impurity seed cotton cleaning machine comprises one large roller which is arranged in a shell and is provided with a rack, a cotton brushing device matched with the large roller, and one independent recovery device, wherein the large roller has a diameter of 860-900 mm; during operation, the large roller has a linear speed of 8.61-8.89 m/s and a rotating speed of 155-165 r/min, the cotton brushing device is made of carbon-steel spring wires with a diameter of 0.35-0.5 mm, and the cotton brushing device is equipped with 88-92 bundles of steel wires per meter in length, each bundle comprises 60 to 70 steel wires, and a spacing between the bundles is 10.5-11.5 mm; and U-shaped racks at an angle of 55-57° are mounted on the surface of the large roller, four racks are mounted per cycle, and the racks have a circumferential spacing of 29.5-30.5 mm;

S3, ginning: ginning the cleaned seed cotton obtained from the step S2 by adopting a stamping-knife-type or hobbing-cutter-type roller gin so as to separate cotton seeds from raw cotton; and S4, finishing raw cotton, comprising:

S41, by using a cotton dust collection cage, carrying out staple collection on the raw cotton obtained by ginning in the step S3 so as to obtain separated raw cotton;

S42, carrying out at least one pass of cleaning and impurity removal on the separated raw cotton by an airflow cleaning machine, and carrying out 1-2 passes of cleaning by a ginned cotton carding machine; and S43, carrying out staple collection by using a cotton dust collection cage again, and carrying out packaging so as to obtain machine-harvested long-staple cotton with low mechanical damage to fibers.

2. The method for producing the raw cotton of the machine-harvested long-staple cotton with the modal length of greater than or equal to 35 mm according to claim 1, wherein the step S0 further comprises: choosing a cotton variety: choosing sea-island long-staple cotton with middle-sized or/and small leaves, the front and back surfaces of the leaves having an intermediate or small amount of fluff or having no fluff, a plant type being a mixed type or a properly loosened type, the lowest ground clearance of blooming bolls being greater than or equal to 18 cm, a final main stem having a diameter of 9.8-11.8 mm, plants in a boll period being not prone to lodging, a fiber length of greater than or equal to 37 mm, and a specific strength of greater than or equal to 42.5 cN/tex.

3. The method for producing the raw cotton of the machine-harvested long-staple cotton with the modal length of greater than or equal to 35 mm according to claim 1, wherein weather selection conditions in the step S02 are that: no rain falls in 24 h after the defoliating agent and the ripening agent are sprayed, the lowest air temperature in 3 to 5 days is 10-15° C., and the daily mean temperature in 7 to 10 days is 18-21° C.;

the defoliating agent is thidiazuron or a thidiazuron complex preparation, and the ripening agent is ethephon;

in the step S02, the defoliating agent and the ripening agent are sprayed to the cotton field twice; and a spraying solution of the defoliating agent and the ripening agent in the step S02 is selected from one of the following solutions:

a first solution: for the first time, spraying 450 mL/hm$^2$ of 50% thidiazuron, 900 mL/hm$^2$ of 40% aqueous ethephon, and an assistant; and for the second time, after 7-10 d, spraying 300 mL/hm$^2$ of 50% thidiazuron, 600 mL/hm$^2$ of 40% aqueous ethephon, and an assistant; and a second solution: for the first time, spraying 120 mL/hm$^2$ of a suspending agent thidiazuron & diuron, 480 mL/hm$^2$ of an assistant alkyl ethyl sulfonate, and 450 mL/hm$^2$ of 40% aqueous ethephon; and for the second time, after 7-10 d, spraying 150 mL/hm$^2$ of a suspending agent thidiazuron & diuron, 600 mL/hm$^2$ of alkyl ethyl sulfonate, and 1,050 mL/hm$^2$ of 40% aqueous ethephon, wherein the total active ingredient content of the suspending agent thidiazuron & diuron is 540 g/L, wherein the diuron content is 180 g/L, and the thidiazuron content is 360 g/L; and the active ingredient content of the assistant alkyl ethyl sulfonate is 280 g/L, and a dosage form of the assistant alkyl ethyl sulfonate is a soluble concentrate.

4. The method for producing the raw cotton of the machine-harvested long-staple cotton with the modal length of greater than or equal to 35 mm according to claim 1, wherein the step S23 specifically comprises:

carrying out one pass of cleaning by the inclined seed cotton cleaning machine;

carrying out one pass of cleaning by the large-impurity seed cotton cleaning machine;

carrying out one pass of cleaning by the inclined seed cotton cleaning machine;

carrying out 0 to 1 pass of cleaning by the large-impurity seed cotton cleaning machine; and carrying out 0 to 2 passes of cleaning by two inclined seed cotton cleaning machines arranged in an up-and-down staggered stacking manner.

5. The method for producing the raw cotton of the machine-harvested long-staple cotton with the modal length of greater than or equal to 35 mm according to claim 1, further comprising a step S24 between the step S22 and the step S23, S24, when the water content of the to-be-machined seed cotton is 10-17% or the relative humidity of air in a ginning site is 86-96%, drying to-be-machined seed cotton by adopting a drying device which is a drying tower with 13 to 21 layers; and after the step S24, if the water content after the to-be-machined seed cotton is dried is still greater than or equal to 12%, drying is carried out again after the seed cotton is cleaned by using the large-impurity seed cotton cleaning machine for the first time in the step S23.

6. The method for producing the raw cotton of the machine-harvested long-staple cotton with the modal length of greater than or equal to 35 mm according to claim 1, wherein the ginned cotton carding machine comprises six toothed nail rollers slantingly arranged in a shell from top to bottom, and four cotton baffles each arranged above a gap between two adjacent toothed nail rollers so as to prevent the toothed nail rollers from disorderly cleaning raw cotton; the toothed nail rollers of the ginned cotton carding machine have a diameter of 320-350 mm, a working linear speed of 8.96-9.32 m/s, and a rotating speed of 450 r/min; toothed nails mounted on each toothed nail roller have a length of 49-51 mm; each toothed nail is in a form of a slender cone without a cone tip; a semi-ellipsoid at the tip end of each toothed nail has a diameter of 7-8 mm; a tangent plane at the rear end of each toothed nail has a maximum diameter of 9-10 mm; and the ginned cotton carding machine further comprises spacing bar gratings with a spacing of 7.5-11.5 mm.

\* \* \* \* \*